Jan. 9, 1968 — L. N. WELLS — 3,362,089
VISUAL FLIGHT SIMULATION SYSTEMS
Filed Aug. 9, 1965 — 2 Sheets-Sheet 2

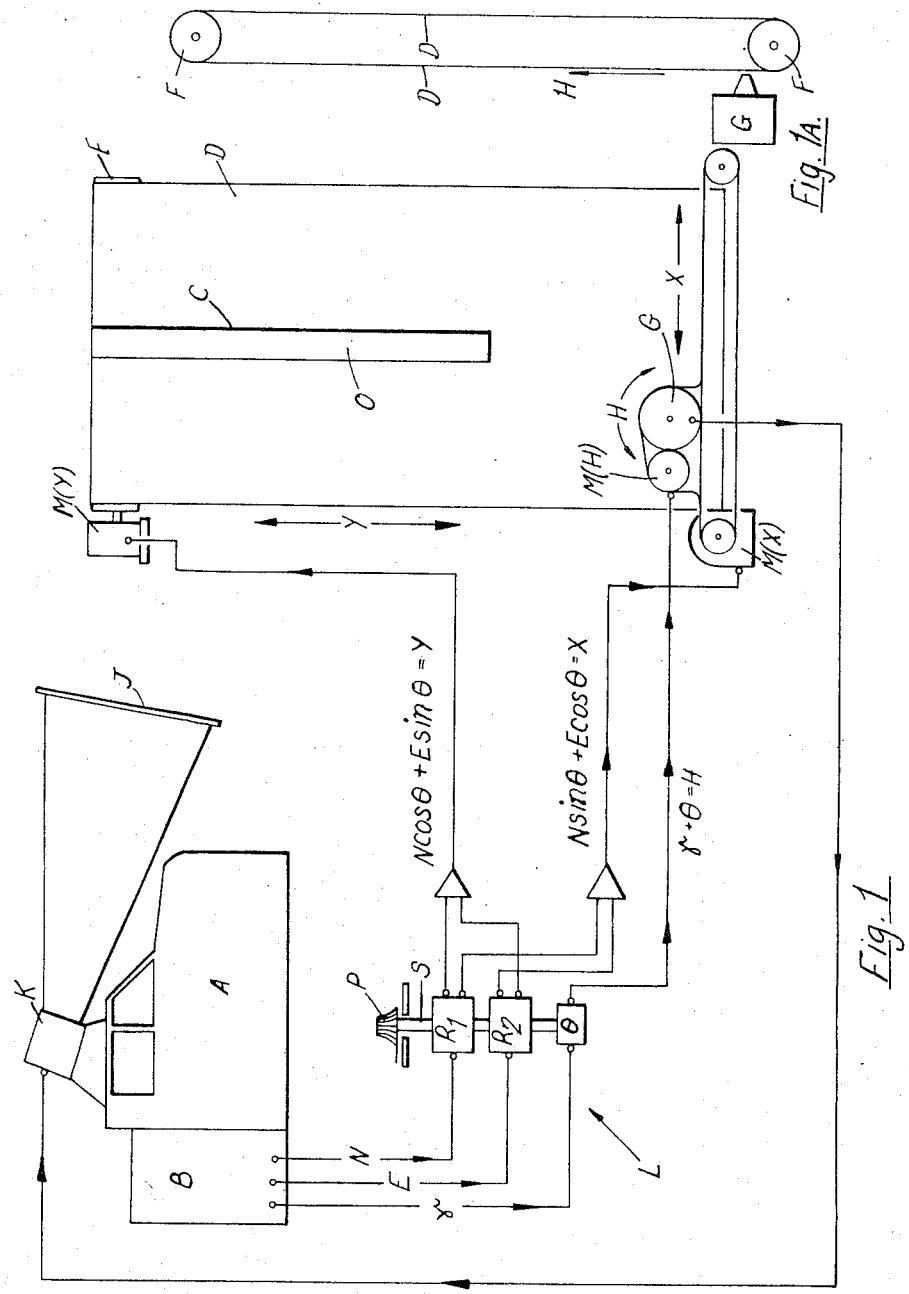

Inventor
LOUIS NORMAN WELLS
By Richard G. Stephens
Attorney

United States Patent Office 3,362,089
Patented Jan. 9, 1968

3,362,089
VISUAL FLIGHT SIMULATION SYSTEMS
Louis Norman Wells, Aylesbury, England, assignor to Redifon Air Trainers Limited, a British company
Filed Aug. 9, 1965, Ser. No. 478,062
Claims priority, application Great Britain, Aug. 7, 1964, 32,293/64
2 Claims. (Cl. 35—12)

ABSTRACT OF THE DISCLOSURE

In a visual display simulating a scene visible from a vehicle (such as an aircraft) in which the scene is generated by positioning a viewing device (such as a television camera) relative to a pattern (such as a terrain model), the provision of an adjustable resolver device for rotating the coordinates of the system used to translate the viewing device relative to the model and for simultaneously rotating the heading of the viewing device, to allow a single terrain model to be used to simulate scenes visible from a plurality of positions having widely differing bearings with respect to the terrain model.

---

Figure 3:
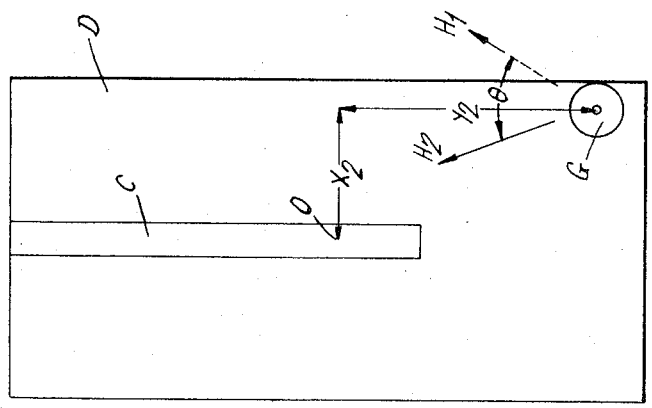

This invention relates to visual flight simulation systems of the kind including a television camera (or equivalent viewing and image-transmitting device) moving in relation to a model terrain in automatic response to the handling by a trainee pilot of an aircraft flight simulator type of training apparatus. It is particularly concerned with visual systems for the simulation of approach to and landing on an airfield runway, providing the view as seen looking forward from the trainee's supposed aircraft.

In order to keep the camera/model assembly of such a system reasonably compact without resort to modelling on an unduly small scale (which has constructional and optical disadvantages), it is customary to limit the model coverage to a single runway and the terrain adjacent to the line of this runway, so that the model has the plan form of a relatively narrow rectangle or strip rather than a large square.

This is quite adequate for most purposes, but it is not appropriate for practising a type of emergency operation in which an aircraft has to break off its landing approach to a runway which is reported as obstructed or damaged, and then fly round and make an approach to, and a landing on, an alternative runway lying at an angle to the unserviceable one. It is the object of the invention to make it suitable for this purpose.

According to the invention the relative motion of camera and terrain model is controlled by signals representing the changing cartesian co-ordinates of the supposed aircraft's plan position, these signals being supplied from the flight simulator equipment via a resolver device which is readily adjustable to turn its resolution axes through a predetermined angle equal to that between the two supposed runways, and means is included whereby this angle is added to the heading angles of the camera with respect to the model.

The way in which this achieves the object of the invention will be apparent from the following description and accompanying diagrammatic drawings: these illustrate an example of the invention applied to a system in which the terrain modelling is on an endless moving belt or band, but it will be appreciated that it is equally applicable with like advantage to other types.

Referring to FIGURES 1 and 1A: the visual flight simulation system includes a trainee pilot's cabin A and a computor installation (indicated at B) which responds to the pilot's operation of his controls by appropriately actuating his flight instruments and other effects. It also provides outputs indicative of the geographical progress of the simulated flight for use in the navigational aspects of training exercises. These features of flight simulators are well known in themselves, and it is unnecessary to describe them in more detail here; it is sufficient to assume that for controlling the motions of the camera/model assembly of the visual system the computed outputs include electrical signals corresponding to the changing cartesian coordinates N and E of the aircraft's position in relation to a geographical reference point 0 on the runway of the destination airfield and to $\gamma$, the aircraft's heading relative to the supposed orientation of that runway.

The terrain modelling (of which, for simplicity, only the actual runway C is indicated in the drawings) is applied to the vertical outer face of an endless flexible band D running over upper and lower rollers F (FIGURE 1A) of which one is driven by a positional servomotor M(Y). The television camera G is mounted at the foot of this assembly in such a way that it can be traversed laterally by a second positional servomotor M(X); accordingly, the camera can be caused to follow any path over the model by the joint action of these two servomotors in following respectively the cartesian position coordinate signals derived from the computor installation B. The camera has a very small mirror (not shown) mounted at an angle at its optical entrance pupil so that it looks up along the model, as indicated by the arrow in FIGURE 1A, and the picture it receives is transmitted by conventional closed-circuit television equipment to a projector K on the roof of the cabin A which displays it on a viewing screen J in front of the pilot's windscreen. The camera can also be rotated about its axis, in the sense indicated at H (FIGURE 1), by a third servomotor M(H) repeating the heading information derived from the computor system. Or this motor may produce the same result by rotating internal parts in the optical system of the camera. In practice, further motions and adjustments of the camera are provided to simulate changes of aircraft height and of its attitudes in pitch and bank, but these are not relevant to consideration of the present invention.

As indicated in FIGURE 1, the signals N, E, and $\gamma$ are not passed directly to the servomotors, but are first processed by an adjustable resolver assembly indicated generally at L. This comprises a shaft S carrying sine/cosine resolver units R1 and R2 and a device—for example that known as a differential synchro—for adding to the aircraft heading signal $\gamma$ the angle $\theta$ to which the shaft S may be set with respect to its datum or zero position. The arrangement is such that the X and Y signals supplied to the camera/model assembly may be either the N and E signals unaltered or other cartesian coordinate signals which likewise define the aircraft position with reference to point 0 but in an axis system rotated through an angle $\theta$ from that to which the values N and E relate. In the drawing, the summation of the component voltages from the resolvers is represented by the conventional symbols, and it will be understood that the resolver units may have the nature of sine/cosine potentiometers or of synchros according as the signals they handle are D.C. or A.C. voltages.

Figure 2:
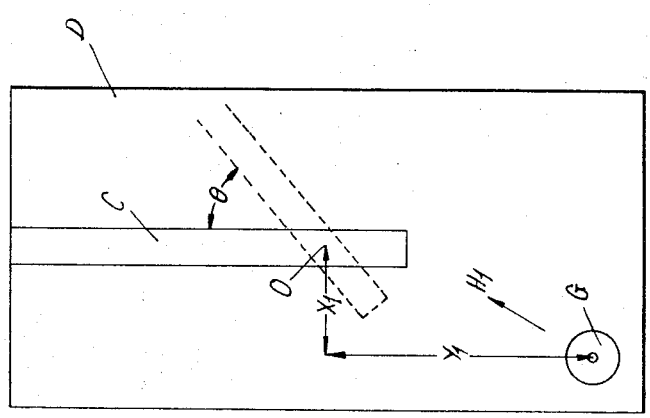

The effect of a change in $\theta$ is that to the simulator pilot it will appear that the terrain has been slewed through the angle in question about the reference point 0, and the runway C will now have the position and orientation of the alternative runway and may be treated as such. This effect is illustrated by FIGURES 2 and 3. In FIGURE 2 it is supposed that the resolver shaft is at the "zero" setting, i.e., that the values of E, N, and $\gamma$ are applied unaltered to the camera/model assembly as X1, Y1, and H1 respectively. If now the resolver shaft is turned to a value $\theta$, new values X2 and Y2 of the cartesian coordinates will appear and the camera and model band will both shift to take up the relative positions shown in FIGURE 3. At the same time, the camera heading will move through angle $\theta$ from H1 to H2. Since none of this will have affected the aircraft's own compass or radio navigation simulating equipment, the net effect is that the runway in FIGURE 2 will seem to have been turned to the alternative position shown in dotted lines, nothing else being changed.

Thus the emergency exercise previously referred to can readily be practiced, the re-orientation of the runway being effected while the trainee has his view obscured by being "in cloud," which is in any case normally ensured during the downwind part of circuit flying in visual flight simulating systems. The invention avoids the need of physically including the additional and oblique runway in the model, which would involve expensive and mechanically undesirable increases in the width of the model band and in the range of X-motion needed by the camera.

Whilst the resolver assembly L has been shown in FIGURE 1 as manually adjustable by a knob and dial arrangement indicated at P, it will be understood that arrangements could readily be made, using conventional techniques, for it to be turned through the appropriate angle (or angles, where more than two runway orientations may be contemplated) by a servomotor slaved to an instructor's remote control.

It will also be appreciated that any simulated radio or navigation aid such as the Instrument Landing System (ILS) which may be associated with one only of two supposed runways must not share the re-orientation process or must be switched out of action when it occurs.

I claim:

1. In a grounded flight trainer having a student's station, a plurality of controls operable by a student, a computer responsive to operation of said controls and operable to provide a plurality of computed quantities representing the position coordinates and the heading of a simulated aircraft relative to the runway direction of a simulated airfield, a terrain model having an aircraft runway, a display generation device comprising a viewing device for viewing said terrain model and a display projection means for providing images to said student of the terrain model as viewed by the viewing device, and means responsive to certain of said computed quantities for translating and rotating said viewing device with respect to said terrain model, the combination of resolver means adjustable by an instructor for modifying certain of said position coordinate computed quantities in accordance with a selected angle thereby to translate said viewing device to a different bearing with respect to said terrain model, and means synchronized with said resolver means for simultaneously modifying said computed heading quantity by the amount of said selected angle thereby to rotate said viewing device with respect to said terrain model.

2. A trainer according to claim 1 in which said viewing device comprises a television camera and said display projection means comprises a television projector.

References Cited
UNITED STATES PATENTS

| | | | |
|---|---|---|---|
| 2,715,497 | 8/1955 | Droz et al. | 235—61.5 |
| 2,883,763 | 4/1959 | Schaper | 35—12 |
| 2,959,779 | 11/1960 | Miller et al. | 343—6 |
| 2,979,832 | 4/1961 | Klemperer | 35—12 |
| 2,981,008 | 4/1961 | Davis et al. | 35—12 |
| 2,988,821 | 5/1961 | Bolie | 35—10.4 |

EUGENE R. CAPOZIO, *Primary Examiner.*

R. WEIG, *Assistant Examiner.*